United States Patent Office 3,055,179
Patented Sept. 25, 1962

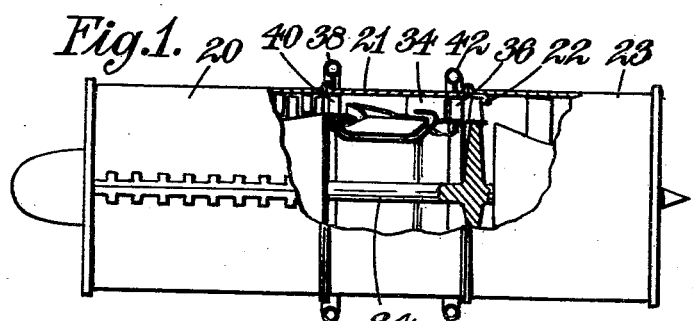
Fig.1.
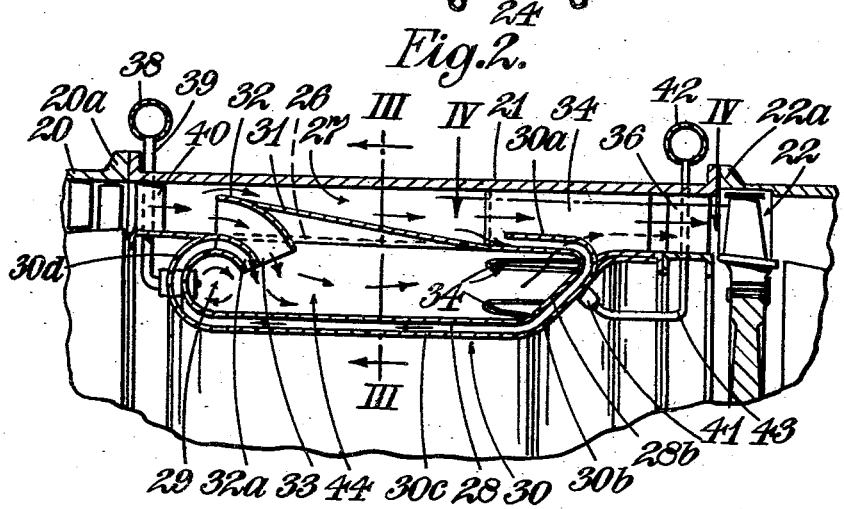
Fig.2.
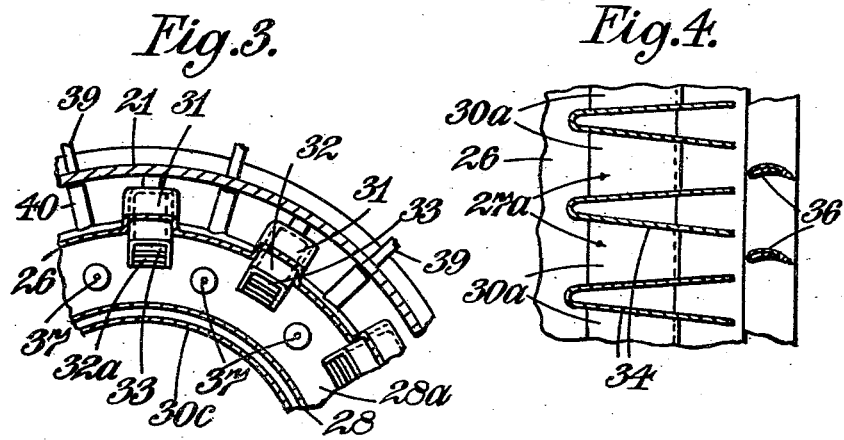
Fig.3.
Fig.4.

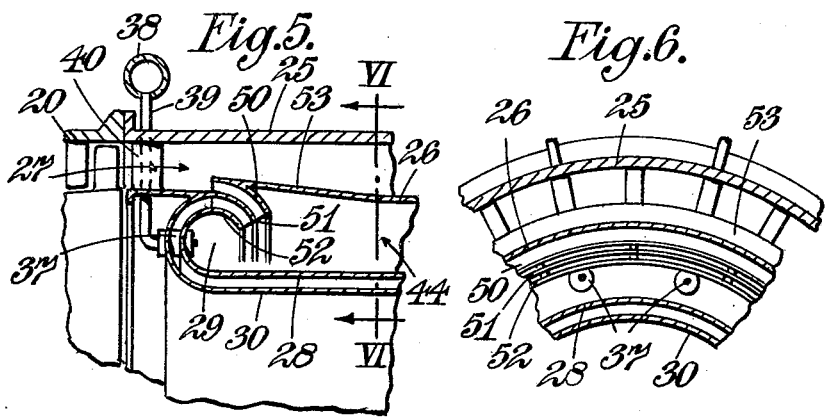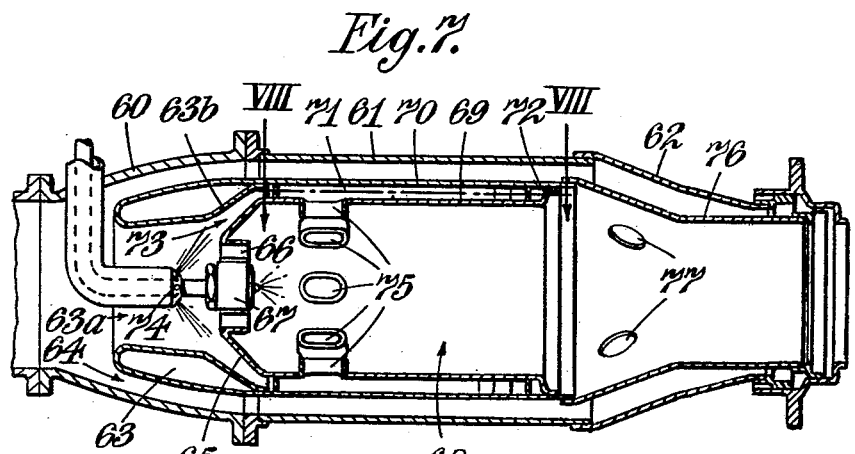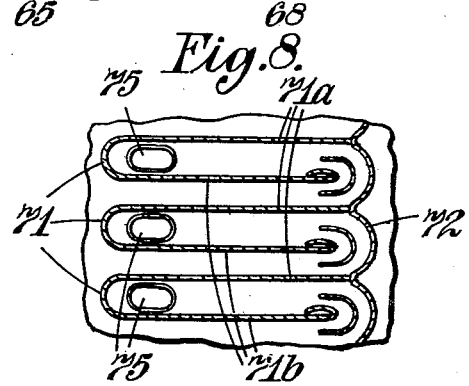

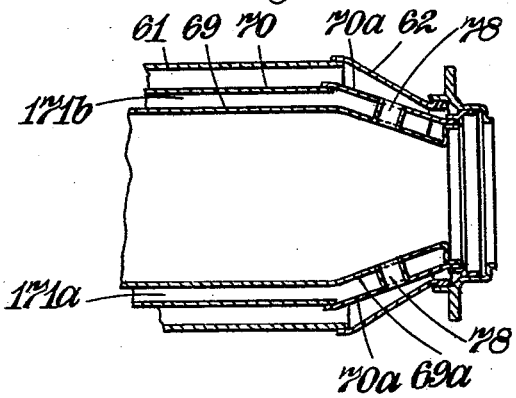
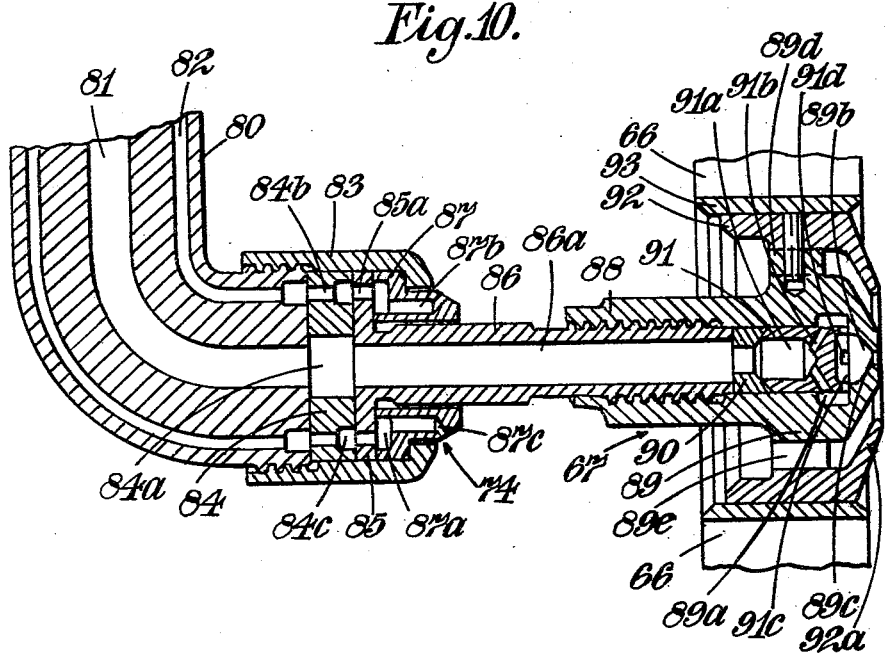

3,055,179
GAS TURBINE ENGINE COMBUSTION EQUIPMENT INCLUDING MULTIPLE AIR INLETS AND FUEL INJECTION MEANS
Arthur Henry Lefebvre, Mackworth, Derby, and Gordon Allan Halls, Alvaston, Derby, England, assignors to Rolls-Royce Limited, Derby, England, a British company
Filed Mar. 2, 1959, Ser. No. 796,550
Claims priority, application Great Britain Mar. 5, 1958
14 Claims. (Cl. 60—39.65)

This invention comprises improvements in or relating to combustion equipment, for example for use with gas turbine engines, of the kind in which a liquid fuel is burnt with a combustion supporting gas, usually air.

According to the present invention, combustion equipment has a flame tube defining a combustion space including a pilot combustion zone at one end of the space into which zone atomized liquid fuel is sprayed to be burnt therein with air, and a secondary combustion zone which is downstream of the pilot combustion zone and in which combustion is completed by addition of further air and by addition of vaporised fuel, the vaporised fuel being added except under low fuel flow conditions, the additional air and vaporised fuel being obtained by providing ducting externally of the flame tube through which ducting air is led in contact with the flame tube firstly towards the downstream end of the flame tube and then forwardly to a point of injection into the flame tube adjacent the upstream end thereof, and by spraying fuel into the air except under low fuel flow conditions during its passage through the ducting. In this way the flame tube wall is cooled, the air is heated prior to injection, and the fuel is vaporised to form with the heated air a homogeneous premixed vaporised fuel/air mixture, and thereby the stability of combustion and combustion efficiency are improved especially at altitude.

Under low fuel flow conditions, such as occur for example at light-up or when throttling back quickly, when no fuel-cooling of the flame tube wall is necessary, all the fuel may be supplied as atomised liquid to the pilot zone.

Under such low fuel flow conditions the additional air is itself adequate for cooling the flame tube and the heat thus added to the additional air improves combustion stability. Under conditions when fuel is supplied to the additional air and is vaporised by the heat of the flame tube, the heat is utilised both to increase the temperature of the additional air and to vaporise the fuel. This results in a high rate of heat release and good efficiency due to vaporisation, heating and premixing.

Thus, in each instance, when air is added alone and when a vaporised fuel/air mixture is added, heat is removed from the downstream portion of the flame tube walls and returned to the pilot zone so improving the combustion performance.

According to a preferred feature of this invention, the major portion of the air flowing to the combustion equipment is arranged to by-pass the combustion zones and a minor proportion only of the air is fed to the combustion zone. The by-passed air is either mixed with the combustion products adjacent the outlet of the combustion equipment or is fed to the location of use, say to a turbine, in stratified form, the combustion gases also being stratified and the air strata alternating with the gas strata.

According to one preferred embodiment of combustion equipment according to this invention for use with a gas-turbine engine, there is provided a substantially straight-through uniform cross-section annular air passage leading from the air inlet of the combustion equipment to the outlet of the combustion equipment, an annular flame tube coaxial with said passage and having a radially outer wall forming the internal wall of the air passage, and a radially-inner wall spaced inwards from said outer wall, the upstream end of the inner wall being turned over outwardly to form a substantially toroidal pilot combustion zone at the upstream end of the flame tube, air inlet chute structure extending from the upstream end of the straight through air passage into the flame tube adjacent said pilot zone, an air jacket extending along the downstream portion of the outer wall of the flame tube around the downstream end of the flame tube along the inner wall of the flame tube and around said turned-over portion, the jacket and the walls of the flame tube defining between them an air flow path having inlets thereto from said straight-through air passage and outlets therefrom into the flame tube adjacent said air inlet chute structure, first fuel injection means to spray fuel into the pilot combustion zone, second fuel injection means to spray fuel into the air flowing in the air path between the flame tube and the air jacket at a position adjacent the downstream end of the flame tube, and combustion gas outlet chutes extending from the downstream end of the flame tube across the straight-through air passage, said combustion gas chutes having downstream facing outlets.

In another form of the invention, the combustion equipment comprises a tubular flame tube having a direct air inlet thereto at one end and an outlet at its other end and a tubular air casing coaxial with and surrounding the flame tube to form an air passage externally of the flame tube, and the flame tube is double-walled, the space between the double walls being divided by longitudinal partitions into a series of air paths each leading from the inlet end of the flame tube to adjacent its outlet end and then back towards the inlet end to air inlet chutes projecting into the flame tube at a position axially spaced from its inlet end. Part of the air entering the combustion equipment flows into the air passage between the flame tube and air casing to a point adjacent the outlet of the combustion chamber where the air is mixed with the combustion products, and the remainder flows into an antechamber at the inlet end of the flame tube where the air is further divided, part flowing into the series of paths to be preheated and the remainder directly into the combustion space within the flame tube. Fuel is sprayed into the upstream end of the combustion space to burn in a pilot zone and further fuel is sprayed into the air entering the series of paths so as to be vaporised and to enter the combustion admixed with heated air.

Some constructions of combustion equipment embodying the above and other features of the invention will now be described with reference to the accompanying drawings in which:

FIGURE 1 is a diagrammatic illustration of a gas-turbine engine, parts being broken away to show the construction, FIGURE 2 is a view to a larger scale of part of FIGURE 1, FIGURE 3 is a section on the line III—III of FIGURE 2, FIGURE 4 is a section on the line IV—IV of FIGURE 2, FIGURE 5 is a view corresponding to FIGURE 2 illustrating a modification, FIGURE 6 is a section on the line VI—VI of FIGURE 5, FIGURE 7 is an axial section through another form of combustion equipment.

FIGURE 8 is a developed view on the line VIII—VIII of FIGURE 7,

FIGURE 9 illustrates a modification of part of FIGURE 7, and

FIGURE 10 illustrates in section a form of fuel injector suitable for use with combustion equipment according to FIGURES 7 to 9.

The gas-turbine engine illustrated in FIGURE 1 comprises a compressor 20 shown as an axial-flow compressor, combustion equipment 21 to which the air compressed in the compressor 20 is delivered to have fuel burnt with it, a turbine 22 receiving hot gases from the combustion equipment and an exhaust assembly 23 through which the gases exhausting from the turbine flow to atmosphere. The turbine 22 drives the compressor 20 through a shaft 24 extending coaxially through the combustion equipment 21.

Referring to FIGURES 2 to 4, the combustion equipment 21 is illustrated as annular combustion equipment and it comprises a main tubular outer casing 25 which extends axially from the outer casing 20a of the compressor to the outer casing 22a of the turbine.

The combustion equipment also includes an annular wall 26 which forms the radially-inner wall of a straight-through annular air passage 27, of which the outer wall is formed by the casing 25, and also forms the radially-outer wall of a flame tube structure defining an annular combustion space which is coaxial with and at a smaller radius than the air passage 27. The flame tube also comprises a radially-inner wall 28 the upstream end 28a of which is turned-over to form a toroidal pilot combustion zone 29, and the downstream end 28b of which is frusto-conical and is joined to the wall 26.

The combustion equipment also comprises an air jacket 30 for the flame tube and the air jacket comprises a portion 30a encircling and in spaced relation to the portion of the wall 26 adjacent the downstream end of the combustion space, a portion 30b in spaced relation to the end 28b of the wall 28, a portion 30c extending lengthwise of the main portion of the wall 28 in spaced relation thereto and coaxially within it and a turned-over portion 30d externally of the end 28a of the wall 28.

The wall 26 has projecting outwardly from it towards the casing 25, a series of circumferentially-spaced longitudinal flutes 31 which form fairings for a corresponding series of air chute members 32 having inlets facing upstream in the air passage 27 towards the outlet of the compressor 20 and outlets into the combustion space adjacent the pilot combustion zone 29. Each air chute member 32 has an internal wall 33 separating main air inlet passages leading from the passage 27 into the flame tube and secondary air passages 32a opening at their upstream ends into the space between the parts 28a and 30d and opening at their downstream ends into the annular combustion space.

The combustion space is provided with outlet chutes 34 in the form of circumferentially-spaced members extending from the wall 26 outwardly to the casing 25, each member having a pair of walls which diverge in the downstream direction. The space between the pair of walls of each chute 34 is open at its radially-inner end to the combustion space and is open at its downstream end to provide a hot gas outlet. It will be seen from FIGURE 4 that the outlets from the chutes 34 are aligned with the spaces between nozzle guide vanes 36 at the entry of the turbine 22.

The combustion equipment also comprises fuel injection means including first fuel injectors 37 spraying liquid fuel into the pilot combustion zone 29 and fed with fuel from a manifold 38 through pipes 39 which extend through a series of outlet guide vanes 40 at the outlet of the compressor 20. It will be seen from FIGURE 3 that the fuel injectors 37 open into the pilot combustion zone 29 at positions angularly midway between the chutes 32. The fuel injection means also comprises second fuel injectors 41 which spray fuel into the space between the parts 28b and 30b, the fuel injectors 41 being fed from a manifold 42 through pipes 43 extending through the nozzle guide vanes 36.

In operation, air enters the air passage 27 directly from the compressor 20 and the bulk of it flows straight through the air passage 27 towards the outlet end of the combustion equipment to leave it through the spaces 27a (FIGURE 4) formed between the chute 34 and thus to flow directly over the nozzle guide vanes 36 to cool them before entering the turbine 22. A small proportion of the air entering the passage 27 (say 10% of the air) flows into the annular combustion space through the chutes 32 to provide combustion air. A further proportion of the air (say 20% of the air) enters the space between the wall 26 and the part 30a of the air jacket and flows in the air path between the air jacket 30 and the flame tube walls 26, 28 first in the downstream direction as far as the end of the combustion space, then around the downstream end 28b of the flame tube where fuel is injected into it by the injectors 41, then in the upstream direction along the radially-inner wall 28 of the flame tube and finally around the wall of the toroidal pilot combustion zone 29 to enter the combustion space through the auxiliary chutes 32a. During its flow in the air path between the jacket 30 and the flame tube walls 26, 28, the air is heated and any fuel which is sprayed into it by the injectors 41 is vaporised and thus a heated vaporised fuel/air mixture enters the combustion space through the chutes 32a to burn in the pilot and secondary combustion zones 29 and 44 respectively.

The combustion products leave the flame tube through the outlet chutes 34 to flow in the space between the nozzle guide vanes 36 to the turbine rotor.

FIGURES 5 and 6 show a similar arrangement except that in this case instead of chutes 32, 32a angularly spaced around the flame tube, there is provided a fully annular air inlet formed between radially-spaced annular axially curved walls 50, 51 for the direct entry of air into the flame tube from the straight-through passage 27 and a fully annular outlet from the space between the air jacket 30 and the flame tube walls 26, 28, the outlet being formed between the wall 51 and a further fully annular wall 52. In this construction also there is provided a fully annular fairing 53 extending downstream from the wall 50 to the outer flame tube wall 26. The operation in this construction is the same as in the construction of FIGURES 2 to 4.

The constructions of combustion equipment above described have a number of advantages as compared with known combustion equipment. Among the advantages obtainable with these constructions is that the usual diffuser section at the inlet end of the combustion equipment may be omitted so that the engine as a whole can be made shorter in length and the weight of the engine correspondingly decreased.

A further advantage is that the walls 26, 28 of the flame tube are not required to be provided with air inlets along their length to permit a skin of cooling air to flow along their internal surfaces so that thereby manufacture of the flame tube is simplified. Adequate cooling of the outer flame tube wall 26 is obtained by the flow of high velocity air in the passage 27 and adequate cooling of the remainder of the flame tube walls is obtained by the flow of the fuel/air mixture in the space between the jacket 30 and the flame tube wall 28. The presence of the fuel in the air greatly improves the cooling effect.

The above constructions also result in combustion equipment in which there are low pressure losses. This improvement in design is possible due firstly to the absence of a diffuser at the entry to the combustion equipment, secondly to the use of the straight-through flow path for the dilution air which by-passes the combustion space, and thirdly to the fact that the incorporation of normal skin cooling devices in the construction of the flame tubes is avoided.

In conventional combustion chamber designs a large cooling air flow is required to keep the flame tube cool at ground level and low level operation. This flow is normally still present at high altitude when it is not really required. Under these conditions it impairs combustion performance, but it is avoided by adoption of the present invention.

Referring now to FIGURES 7 and 8 of the drawings, there is illustrated a form of combustion equipment suitable for a gas-turbine engine comprising a tubular flame tube and a coaxial surrounding air casing.

The combustion equipment comprises an air casing including a diffuser 60 having secured to its downstream end a main air casing wall 61 of tubular form and at the downstream end of the wall 61 a nozzle section 62.

The combustion equipment also comprises a flame tube having an entry section 63 located within the diffuser 60 and providing an air entry antechamber 63a to the flame tube. The external surface of the entry section 63 is spaced from the diffuser 60 so that an annular passage 64 is formed permitting a flow of air between the flame tube and the air casing. Supported within the flame tube at the downstream end of the entry section there is a conical wall 65 having at its centre a ring of swirl vanes 66 surrounding a swirl type fuel injector 67 which sprays fuel into the upstream end of the combustion space 68 to burn with air flowing through the swirl vanes 66. The combustion space 68 is defined by a tubular wall 69 extending downstream from the wall 65.

A tubular wall 70 is provided to surround the wall 69 and the wall 70 forms an extension of the external surface of the entry section 63. The space between the walls 69, 70 is divided up by a series of circumferentially-spaced U-shaped partitions 71 (FIGURE 8) and a circumferentially-extending scalloped partition 72 adjacent the downstream ends of the partitions 71. One limb 71a of each U-shaped partition is connected to the scalloped partition 72 and the other limb 71b of each partition 71 terminates at its downstream end short of the partition 72. The space between the walls 69, 70 is thus divided up into a series of air paths into which air flows from the space 73 between the frusto-conical wall 65 and a correspondingly shaped wall portion 63b of the entry section. Fuel is sprayed into the space 73 from a spray nozzle 74 and the fuel/air mixture flows in the air paths between the walls 69, 70 firstly in the downstream direction as far as the partition 72 and then in the upstream direction to enter the combustion space 68 through a series of chutes 75, which open to the spaces within the U-shaped partitions 71. In this way the wall 69 is cooled by the fuel/air mixture and the fuel/air mixture is pre-heated sufficiently to vaporise the fuel before its entry into the combustion space 68.

The flame tube also comprises a nozzle outlet portion 76 which is housed within the nozzle section 62 of the air casing in spaced relation thereto and the nozzle portion 76 is provided with a series of holes 77 so that the air flowing between the air casing and flame tube can enter it and mix with the combustion products flowing from the combustion space 68. The mixed combustion products and dilution air leave the combustion equipment to enter the turbine.

Referring now to FIGURE 9, there is shown a modified form of the combustion equipment illustrated in FIGURES 7 and 8. In this construction the walls 69, 70 of the flame tube both have frusto-conical extensions 69a and 70a respectively, extending into the nozzle section 62 of the air casing. In this case the partitions have limbs 171a which extend to the downstream ends of the extensions 69a, 70a and limbs 171b which terminate at a point spaced from the downstream ends of the extensions 69a, 70a. In this construction, the dilution air flowing in the air passage between the flame tube and the air casing is delivered into the combustion products through ferrules 78 mounted in the wall extensions 69a, 70a.

With the forms of combustion equipment illustrated in FIGURES 7, 8 and 9 improved stability of combustion and rate of heat release is achieved for the same reasons as in the constructions of FIGURES 2 to 6, the fuel sprayed into the combustion space 68 by the injector 67 burning in a pilot zone upstream of the chutes 75. Combustion is completed with the addition of pre-heated vaporised fuel/air mixture in the combustion space 68 downstream of the pilot zone.

The constructions of flame tube described with reference to FIGURES 7 to 9 may also be employed in tubo-annular combustion equipment, that is combustion equipment comprising a plurality of flame tubes disposed within an annular air casing structure.

In FIGURE 10 there is illustrated a form of fuel injector suitable for use with combustion equipment as shown in FIGURES 7 to 9, and it comprises as an integral structure both the swirl type fuel injector 67 and the spray nozzle 74.

The combined fuel injector is carried by a double fuel pipe 80 having a central bore 81 for supplying fuel to the injector 67 and a bore 82 for supplying the spray nozzle 74. The end of the pipe 80 is threaded and is engaged by a cap nut 83 which retains a spacer plate 84, a flange 85 at the end of a transfer pipe 86 and an annular nozzle member 87 in position against the end of the pipe.

The spacer plate 84 has a central hole 84a connecting the bore 81 of the pipe 80 with a bore 86a running through the transfer pipe 86, and also has a ring of holes 84b leading to an annular groove 84c in its downstream face which groove coincides with a series of holes 85a in the flange 85. The holes 85a open to an annular groove 87a in the upstream face of the annular nozzle member 87 and so fuel flows from the annular bore 82 in the pipe 80 through the holes 84b into the annular groove 84c and from the latter through the holes 85 into the annular groove 87a in the nozzle member 87. The nozzle member 87 is also formed with a series of axial drillings 87b leading from the groove 87a to a series of spray orifices 87c. The spray orifices 87c are arranged with their axes in the surface of a cone of wide apex angle.

The transfer pipe 86 is threaded at its end remote from the flange 85 and has screwed onto it a sleeve-like extension 88 on the main body 89 of the injector 67. The body 89 has a central bore containing a spacer washer 90 which abuts the end of the transfer pipe 86, and a fuel distributor plug 91 having a central chamber 91a receiving fuel from the bore 86a through the washer 90 and delivering the fuel through a series of drillings 91b into an annular inwardly-facing channel 89a at the downstream end of the bore in the body 89.

The end of the plug 91 remote from the transfer pipe 86 is formed with a recess 91c which is connected with the channel 89a by swirl ports 91d. The recess 91c registers the larger-diameter end of a conical swirl chamber 89b formed in the downstream end of the body 89 and the chamber 89b has a small outlet orifice 89c at its narrower end. Fuel entering the chamber 89b leaves the injector as a conical spray through the orifice 89c.

The body 89 has a notched peripheral flange 89d on which is fitted a tubular shroud member 92 which has at its downstream end a frusto-conical flange 92a overlying the downstream face of the body 89. In operation part of the air entering the combustion space flows through the notches 89e in the flange 89 and is directed inwardly by the flange 92a over the surface of the body 89 towards the orifice 89c to assist in the prevention of carbon formation on the injector 67. The shroud 92 is a sliding fit within a sleeve 93 joining the inner ends of the swirl vanes 66.

In each of the arrangements described above, the supply of pilot fuel may be increased steadily as the fuel flow rises until a certain fuel flow is reached after which the supply of pilot fuel can be held constant and the fuel supply to the flame tube increased by increasing the main supply, i.e. the vaporised fuel.

We claim:

1. Combustion equipment for a gas turbine engine, having an air inlet at one end and an outlet at its opposite end and comprising means defining a substantially straight-through uniform cross-section annular air passage leading from the air inlet of the combustion equipment to the outlet of the combustion equipment, an annular flame tube coaxial with said air passage and having a radially outer wall forming the internal wall of the air passage and a radially-inner wall spaced inwards from said outer wall, the upstream end of the inner wall being turned over outwardly to form a substantially toroidal pilot combustion zone at the upstream end of the flame tube, air inlet chute structure extending from the upstream end of the straight-through air passage into the flame tube adjacent said pilot zone, an air jacket extending along the downstream portion of the outer wall of the flame tube around the downstream end of the flame tube along the inner wall of the flame tube and around said turned-over portion in spaced relation to the flame tube walls, the jacket and the walls of the flame tube defining between them air flow ducting having inlets thereto from said straight-through air passage and outlets therefrom into the flame tube adjacent said air inlet chute structure, first fuel injection means positioned to spray fuel into the pilot combustion zone, second fuel injection means positioned to spray fuel into the air flowing in the ducting between the flame tube and the air jacket at a position adjacent the downstream end of the flame tube, and combustion gas outlet chutes extending from the downstream end of the flame tube across the straight-through air passage, said combustion gas chutes having downstream facing outlets.

2. Combustion equipment according to claim 7, wherein the air inlet chute structure comprises a plurality of circumferentially-spaced air inlet chutes having inlets thereto facing upstream in the straight-through air passage and outlets into the flame tube, and the first fuel injection means comprises a plurality of circumferentially-spaced fuel injectors, each injector being angularly midway between a pair of the chutes.

3. Combustion equipment according to claim 2, comprising for each chute member a wall dividing the chute member internally to provide main air inlet passages leading from the straight-through air passage into the flame tube and secondary passages communicating with said ducting and forming the ducting outlets.

4. Combustion equipment according to claim 1, wherein the air inlet chute structure comprises radially-spaced annular walls forming between them a fully annular inlet leading from the straight-through air duct into the flame tube and a fully annular outlet communicating with and forming the outlet of said ducting.

5. Combustion equipment according to claim 1, wherein the combustion gas outlet chutes comprises a series of circumferentially-spaced members, each member having a pair of walls which diverge in the downstream direction, the space between the diverging walls being open at its radially-inner end to within the flame tube and being open at its downstream end to provide a hot gas outlet.

6. Combustion equipment according to claim 1, said air inlet chute structure, said annular air passage, said flame tube and said jacket are dimensioned such that about 10% of the total air fed to the combustion equipment enters the flame tube through the air inlet chute structure, about 20% enters the flame tube through said ducting and the remainder flows directly to a region of use of the gases delivered through the combustion gas chutes.

7. Combustion equipment comprising a flame tube having a wall defining a combustion space having a pilot combustion zone at one end, a combustion gas outlet at its opposite end and a secondary combustion zone downstream of the pilot combustion zone, first liquid fuel injectors continuously spraying atomized liquid fuel into the pilot combustion zone, first air inlet means delivering air into said combustion space adjacent said pilot combustion zone, wall means externally of and together with said wall of the flame tube defining air flow ducting having an outlet into the flame tube between said pilot and secondary combustion zones, said ducting extending to convey air in contact with the external surface of the flame tube wall first in a direction from the one end of the flame tube to adjacent said opposite end and then in the opposite direction in contact with the external surface of the flame tube wall from the opposite end to said outlet from the ducting, and second liquid fuel injectors spraying liquid fuel into the air flowing in said ducting.

8. Combustion equipment according to claim 7, said air flow ducting having a second air outlet adjacent said opposite end of the flame tube, said second air outlet being dimensioned to permit a major proportion of the air flowing in the ducting to by-pass the combustion space, a minor proportion of the air flowing in said opposite direction to the outlet from the ducting into the flame tube, said second fuel injectors spraying liquid fuel in said minor proportion of air.

9. Combustion equipment according to claim 8, said combustion gas outlet from the combustion space delivering combustion gases to mix with said major portion of air flowing through the second outlet of the ducting.

10. Combustion equipment according to claim 8, said flame tube being annular, said second ducting outlet also being annular and surrounding the flame tube at said opposite end, and said combustion gas outlet comprising a series of angularly spaced chutes extending radially outwards from the flame tube across said second ducting outlet, said chutes having outlets facing in the direction of air flow through said second ducting outlet.

11. Combustion equipment comprising a flame tube, an air casing surrounding the flame tube to define an air passage externally of the flame tube, said flame tube having a wall defining a combustion space having a pilot combustion zone at one end, a combustion gas outlet at its opposite end and a secondary combustion zone downstream of the pilot combustion zone, first liquid fuel injectors continuously spraying atomized liquid fuel into the pilot combustion zone, first air inlet means delivering air into said combustion space adjacent said pilot combustion zone, said first air inlet means opening directly to said air passage, tubular wall means externally of and together with said wall of the flame tube defining air flow ducting having an outlet into the flame tube between said pilot and secondary combustion zones, longitudinal partitions extending radially and axially between the flame tube and the wall means to divide the ducting between them into a series of air paths each leading from the inlet end of the flame tube to adjacent its outlet end and then back towards the inlet end to said ducting outlet, said air paths receiving air from said air passage and conveying air in contact with the external surface of the flame tube wall first in a direction from the one end of the flame tube to adjacent said opposite end and then in the opposite direction in contact with the external surface of the flame tube wall from the opposite end to said outlet from the ducting, said ducting outlet comprising air chutes projecting into the flame tube at a position axially spaced from its inlet end, the first fuel injectors spraying liquid fuel into the air entering the pilot combustion zone through said first air inlet means, and second fuel injectors spraying liquid fuel into the air flowing into the air paths defined by the partitions.

12. Combustion equipment according to claim 11, comprising also a scalloped partition extending circumferentially of the flame tube adjacent its downstream end, said longitudinally-extending partitions being U-shaped and having each a first and longer limb connected at its downstream end to the scalloped circumferentially-extending partition, and a second and shorter partition having its downstream end spaced longitudinally from the scalloped partition, said air chutes opening between the limbs of the U-shaped partitions.

13. Combustion equipment according to claim 11, wherein the flame tube wall and the tubular wall means extend to adjacent the outlet of the combustion equipment and the longitudinal partitions extend to the outlet end of the flame tube.

14. Combustion equipment according to claim 11, said flame tube having at its air inlet end structure defining an antechamber, air entering the antechamber being divided to flow partly through said first air inlet means and partly into said air paths defined by the partitions.

References Cited in the file of this patent

UNITED STATES PATENTS

| | | |
|---|---|---|
| 2,243,467 | Jendrassik | May 27, 1941 |
| 2,621,477 | Powter | Dec. 16, 1952 |
| 2,646,664 | Meschino | July 28, 1953 |
| 2,727,358 | Howes | Dec. 20, 1955 |
| 2,931,174 | Allen | Apr. 5, 1960 |
| 2,941,364 | Stokes | Jan. 21, 1960 |

FOREIGN PATENTS

| | | |
|---|---|---|
| 598,947 | Great Britain | Mar. 2, 1948 |
| 780,493 | Great Britain | Aug. 7, 1957 |